United States Patent

Hailey

Patent Number: 5,203,394
Date of Patent: Apr. 20, 1993

[54] LOUVER SYSTEM

[76] Inventor: Anderson Hailey, 4525 Texas St., Apt. #8, San Diego, Calif. 92116

[21] Appl. No.: 644,433

[22] Filed: Jan. 22, 1991

[51] Int. Cl.$^5$ .......................... E06B 7/084; E06B 3/04
[52] U.S. Cl. .................................. 160/166.1; 49/74.1; 160/236; 160/900
[58] Field of Search .................. 160/166.1, 178.1, 236, 160/900, 40, 176.1, 352, 332; 49/74; 40/470, 473; 52/171, 473

[56] References Cited

U.S. PATENT DOCUMENTS

| | | | |
|---|---|---|---|
| 3,012,294 | 12/1961 | Waldor | 160/236 X |
| 3,377,745 | 4/1968 | Seth | 160/236 X |
| 4,638,580 | 1/1987 | Giannetti | 40/473 X |
| 4,719,957 | 1/1988 | Strelnieks | 160/332 |

Primary Examiner—Carl D. Friedman
Assistant Examiner—Derek J. Berger

[57] ABSTRACT

The triangular shape of the louvers allow light to pass through the first and second color-tinted adjacent sides to add a soft color hue to a room. The third side of the triangular louver is opaque and acts much the same as does a common blind when used to block the light from entering a room. The third side may, however have a decorative scene or pattern on one it to present a pleasant scene to the onlooker. The third side has a rotation restriction and alignment tab on it to align the third sides of the louvers so that the decorative pattern or scene is clearly illustrated and that the louver is positioned to properly block the light. Each louver is removably attached to a support system in such a manner that the louvers may be rotated to allow light to pass through two of the adjacent sides and then be rotated so that the opaque third side is parallel to the window or door and restricts the passage of the light.

5 Claims, 1 Drawing Sheet

LOUVER SYSTEM

BACKGROUND OF THE INVENTION

1. Field of the Invention

This invention relates to a uniquely designed vertical louver that is triangular in cross-section and is also an elongate tubular. Two sides allow varying degrees of color altered light to enter a room and a third side is opaque and may have a decorative pattern on it. One side may block light while the others function as light enhancing members.

2. Description of the Related Art

There have been many types of window coverings and several different types of vertical louver systems to reduce the amount of heat and light entering a room.

U.S. Pat. No. 2,572,957 to R. P. Shaw on Oct. 30, 1951 shows a room illuminator in a vertical mode with glass panels that reflect colored light into a room.

U.S. Pat. No. 3,217,631 to P. C. Thompson, et al., on Nov. 16, 1965 describes a winged louver used to let an air flow into a room through a door or window.

U.S. Pat. No. 4,049,038 to D. L. Hyman, et al., on Sep. 20, 1977 shows a louvered covering system with removable strips to attach wallpaper, reflective material and other covers to the louvers.

U.S. Pat. No. 4,628,980 to J. G. Le Houillier on Dec. 16, 1986 describes a louver system with tabs in the louvers to place removable decorative panels. The panels can then be slid back and forth as desired to cover a window or door.

SUMMARY OF THE INVENTION

The triangular shape of the louvers allows light to pass through the two color-tinted sides to add a soft color hue to a room. The colors of the two adjacent sides can be of the same color or of differing color to provide a variety of soothing colors to a room. The third side of the triangular louver is opaque and acts much the same as does a common blind when used to block the light from entering a room. The third side may, however have a decorative scene or pattern on one it to present a pleasant scene to the onlooker. The third side has a rotation restriction and alignment tab on it to align the third sides of the louvers so that the decorative pattern or scene is clearly illustrated. The alignment tab also assures that the louver is positioned to properly block the light. Each louver is removably attached to a support system in such a manner that the louvers may be rotated to allow light to pass through two of the adjacent sides and then be rotated so that the opaque third side is parallel to the window or door and restricts the passage of the light.

A louver system used in combination with a vertical support system is described that has a plurality of parallel tubular triangular elongate louvers rotatably attached to the support system at one end of the louvers. The louvers depend vertically from the support. There is a first side and a second side of the triangular louver. The first and second sides are made of a material that will allow light to pass through. The first side and second side are connected to each other thereby forming adjacent sides of the triangular louver. A third side of the triangular louver is made of a opaque material. The third side is opposite of an angle formed by the joining of the first side and second side. The third side has a rotation restriction and alignment tab depending from it.

A louver system may have a suspension tab attached to the one end of the tubular triangular elongate louvers to a connect the louvers to the support system. There may be a connection port in the suspension tab to receive a suspension fastener. The material of the first side and second side is able to change the color of the light passing through the material. The preferred manner of doing this is to provide a material that is tinted the preferred color of the light desired to enter the room. The material of the third side may have a decorative pattern placed thereon.

It is an object of this invention to provide an elongate tubular louver that is triangular in cross-section that will allow the user to rotate the louver to either allow a tinted light to enter through two of the sides of the triangle or to restrict the passage of the light by aligning the third side parallel to the window or door.

It is another object of this invention to provide a louver that will allow the user to place a decorative scene or pattern on the third side to present a pleasant view to the user when the louver is restricting the light.

DESCRIPTION OF THE PREFERRED EMBODIMENT

Figures 1, 2, 3:
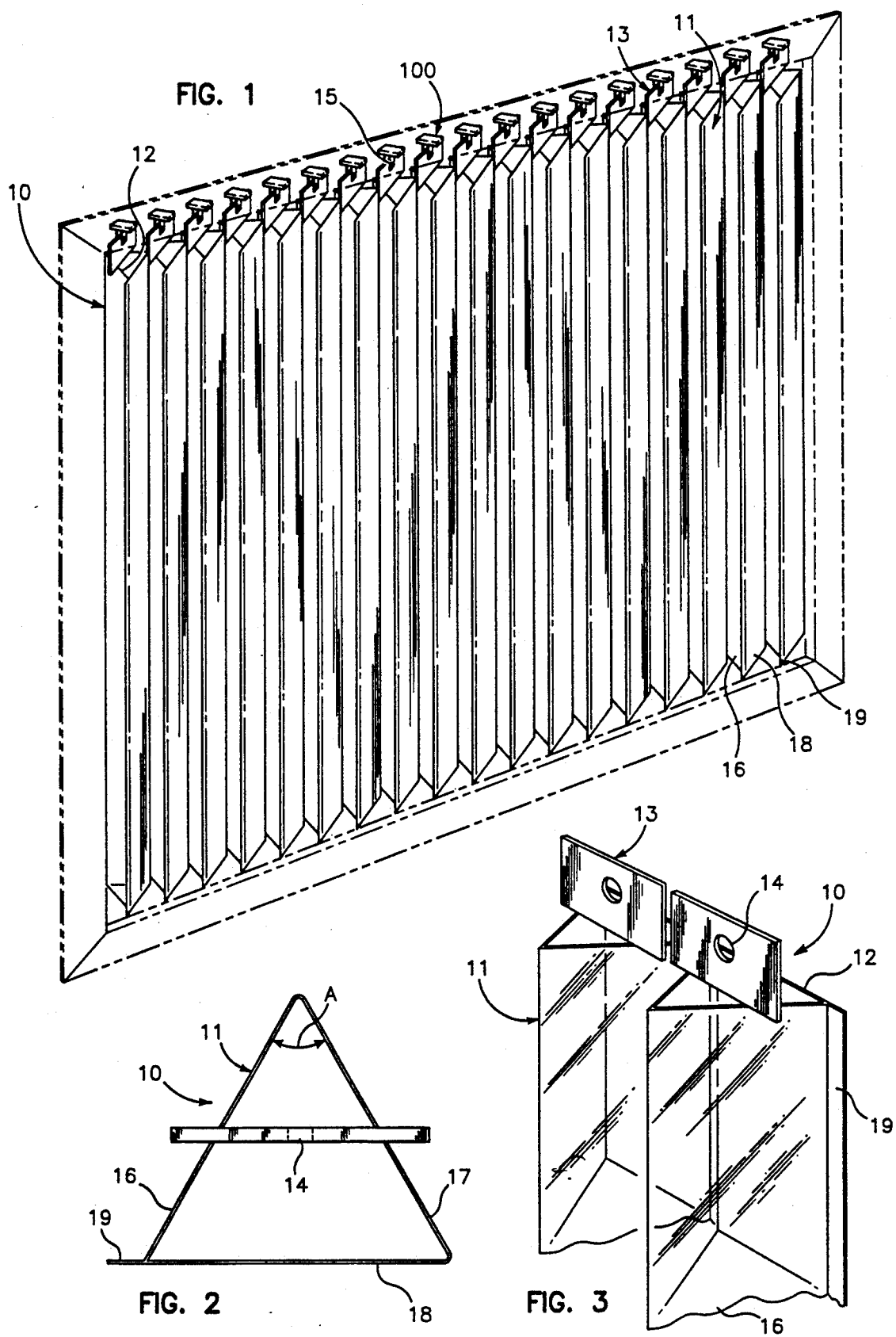
FIG. 1 is a perspective view of the louver system suspended from a conventional louver support system and shown placed near a window shown in phantom. The louvers are shown in a position that would allow the first and second sides of the triangular louvers to let tinted light enter the room.
FIG. 2 is a top view of one of the triangular louvers showing the relationship of the first, second and third sides to the suspension tab, and the rotation and alignment tab.
FIG. 3 is a perspective view of two of the louvers showing the third sides aligned to either restrict the light from entering the room or to present the pattern on the third side for viewing.

FIGS. 1, 2 and 3 show a louver system 10 in combination with a vertical louver support system 100 that has a plurality of parallel tubular triangular elongate louvers 11 rotatably to the support system 100 at one end 12 of each louver 11 and depending vertically therefrom. There is a suspension tab 13 attached to the one end 12 of the tubular triangular elongate louvers 11 to a connect the louvers to the support system 100. There is a connection port 14 in the suspension tab 13 to receive a suspension fastener 15 (shown in FIG. 1).

A first side 16 and a second side 17 of the triangular louver 11 is made of a material that will allow light to pass through. The first side 16 and second side 17 are connected to each other forming adjacent sides of the triangular louver 11. There is a third side 18 of the triangular louver 11 that is made of a opaque material that may have a decorative pattern placed thereon. The third side 18 is opposite of an angle "A" formed by the joining of the first side 16 and second side 17. On the third side is a rotation restriction and alignment tab 19. The material of the first side and second side is able to change the color of the light passing through the material.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A louver system in combination with a vertical louver support system comprising:
   a. a plurality of parallel tubular triangular elongate louvers rotatably attached to the support system at one end of each louver and depending vertically therefrom;
   b. a first side and a second side of each triangular louver being made of a material that will allow light to pass through, and the first side and second side being connected to each other forming adjacent sides of each triangular louver; and
   c. a third side of each triangular louver being made of an opaque material, and being opposite of an angle formed by the joining of the first side and second side, and having a rotation restriction and alignment tab depending thereon.

2. A louver system as described in claim 1 further comprising:
   a. a suspension tab attached to the one end of each tubular triangular elongate louver to connect the louvers to the support system; and
   b. a connection port in the suspension tab to receive a suspension fastener.

3. A louver system as described in claim 1 wherein the material of the first side and second side further comprise being able to change the color of the light passing through the material.

4. A louver system as described in claim 1 wherein the material of the third side further comprises having a decorative pattern placed thereon.

5. A louver system in combination with a vertical louver support system comprising:
   a. a plurality of parallel tubular triangular elongate louvers rotatably attached to the support system at one end of each louver and depending vertically therefrom;
   b. a suspension tab attached to the one end of each tubular triangular elongate louver to connect the louvers to the support system;
   c. a connection port in the suspension tab to receive a suspension fastener;
   d. a first side and a second side of each triangular louver being made of a material that will allow light to pass through, and the first side and second side being connected to each other forming adjacent sides of each triangular louver;
   e. a third side of each triangular louver being made of an opaque material having a decorative pattern placed thereon, and being opposite of an angle formed by the joining of the first side and second side, and having a rotation restriction and alignment tab depending thereon; and
   f. the material of the first side and second side being able to change the color of the light passing through the material.

* * * * *